March 16, 1954   J. J. DIGBY   2,672,055
ENGINE STARTER DRIVE
Filed July 16, 1952

WITNESS:
Esther M. Stockton

INVENTOR.
James J. Digby
BY
Clinton L. James
ATTORNEY

Patented Mar. 16, 1954

2,672,055

UNITED STATES PATENT OFFICE 2,672,055

ENGINE STARTER DRIVE

James J. Digby, Elmira, N. Y., assignor to Bendix Aviation Corporation, a corporation of Delaware Application July 16, 1952, Serial No. 299,085

6 Claims. (Cl. 74—7)

1

The present invention relates to a heavy duty engine starter drive and more particularly to a self-contained drive unit which is attachable to the shaft of a starting motor for making connection with an engine gear and for maintaining said connection until the engine is reliably self-operative.

It is an object of the present invention to provide a novel engine starter drive which is adapted to transmit heavier loads than those customarily transmitted by drives of comparable size, and which is so formed as to maintain the proper location and alignment of its parts in spite of the application of such heavy torque loads.

It is another object to provide such a device incorporating a self-tightening overrunning clutch connection to the drive pinion, and a centrifugally released detent on the pinion for holding it meshed with an engine gear until the engine has attained a predetermined rotational speed.

Further objects and advantages will be apparent from the following description taken in connection with the accompanying drawing in which.

Figure 1:
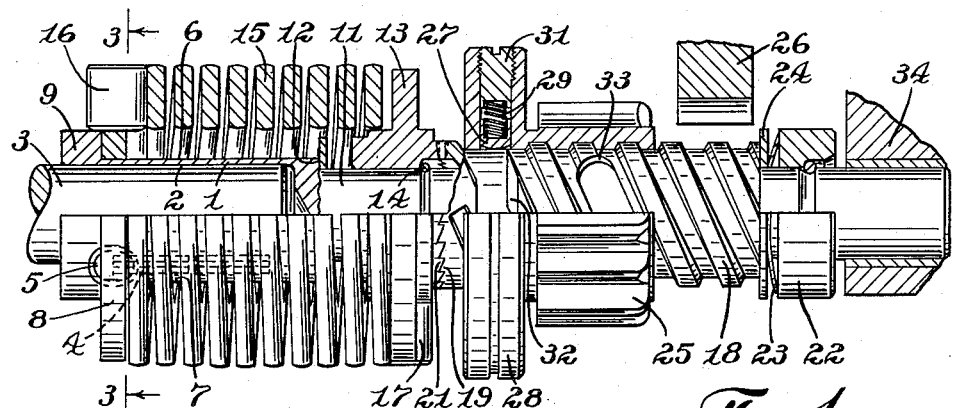
Fig. 1 is a side elevation partially broken away and in section of a drive forming a preferred embodiment of the invention, showing the parts in idle position.
Figure 2:
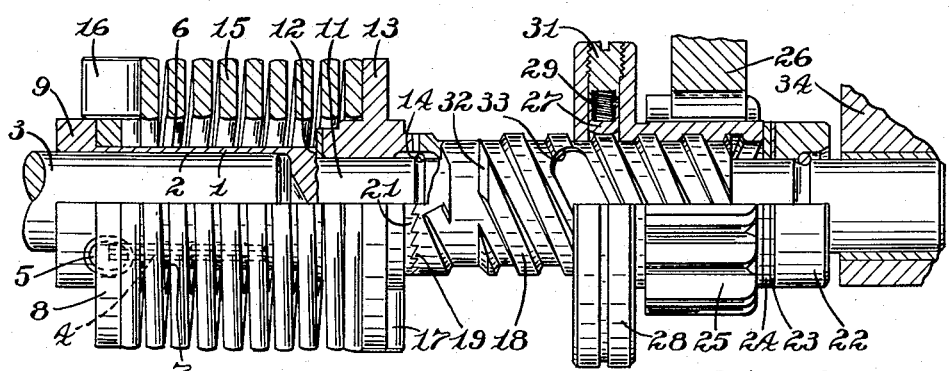
Fig. 2 is a similar view showing the parts in cranking position.
Figure 3:
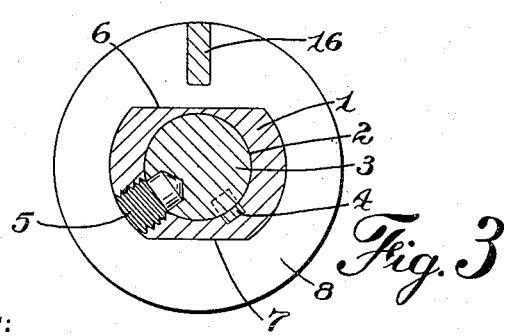
Fig. 3 is a section taken substantially on the line 3—3 of Fig. 1.

In Fig. 1 of the drawing there is illustrated a shaft 1 having a socket 2 in one end adapted to receive the end of the armature shaft 3 of a starting motor, not illustrated. Means in the form of key members 4 and set screw 5 are provided for rigidly connecting said shaft 1 to the motor armature shaft 3.

Shaft 1 is formed with flat surfaces 6 and 7 on which a driving anchor plate 8 is non-rotatably mounted, said anchor plate being retained on the shaft by a terminal flange 9.

Shaft 1 is provided with a smooth reduced extension 11 forming a shoulder 12 adjacent which a driven anchor plate 13 is slidably and rotatably mounted, its movement away from said shoulder being limited by a stop ring 14 seated in a groove in said shaft. A drive spring 15 forms a yielding driving connection between the anchor plates 8 and 13 by virtue of out-turned ends 16, 17 of the spring which enter corresponding slots in the anchor members. Lock ring 14 so positions the anchor plate 13 as to maintain spring 15

2 under a slight initial compression. The compression of spring 15 is limited by the shoulder 12 on the shaft 1 which provides an abutment for the anchor plate 13.

A screw shaft 18 is slidably journaled on the extension 11 of shaft 1, and is provided with overrunning clutch teeth 19 which are adapted to cooperate with similar teeth 21 on the anchor plate 13. A stop member 22 is located on the smooth portion 11 of shaft 1, and a light thrust spring 23 and washer 24 which are interposed between said stop member and the adjacent end of screw shaft 18 yieldingly hold the overrunning clutch teeth in engagement.

A pinion 25 is threaded on the screw shaft 18 for movement into and out of engagement with a gear 26 of an engine to be started, its meshing movement being limited by the stop member 22. A detent 27 is mounted for radial sliding movement in a flange 28 forming part of the pinion 25, and is pressed against the screw shaft 18 by a spring 29 which is positioned by suitable means such as a screw plug 31. Screw shaft 18 has an inclined shoulder 32 in position to be engaged by the detent 27 to yieldingly resist initial meshing movement of the pinion. Said screw shaft is also provided with a radial shoulder 33 so positioned that the detent 27 drops down back of said shoulder as the pinion approaches its fully meshed position, whereby the demeshing movement of the pinion is prevented by engagement of the detent with the shoulder 33 until the pinion is rotating at sufficient speed to withdraw the detent 27 by centrifugal force.

The outer end of the smooth portion 11 of shaft 1 is preferably supported by means of an outboard bearing 34 which may be mounted on the starting motor frame in any suitable manner.

In operation, starting with the parts in the positions shown in Fig. 1, rotation of the starting motor shaft 3 is transmitted through anchor plate 8, spring 15, and anchor plate 13 to the screw shaft 18 by means of the clutch teeth 21, 19. The consequent acceleration of the screw shaft traverses the pinion 25 into mesh with the engine gear 26, and when the movement of the pinion is arrested by the stop member 22, the screw-jack action of the screw shaft and nut forces the screw shaft backward against the anchor plate 13, compressing the drive spring 15 until the movement of said anchor plate is arrested by the shoulder 12 on shaft 1. The overrunning clutch teeth 21, 19 are thus forced tightly together during the subsequent cranking operation.

When the engine starts, the acceleration of the pinion 25 by the engine gear 26 moves the pinion back on the screw shaft until the detent 27 engages the shoulder 33. At this time, the pressure of the screw shaft 18 against the anchor plate 13 is relieved, except for the slight amount produced by the clutch spring 23. The pinion and screw shaft can thus overrun the anchor plate 13 freely without transmitting torque back to the motor shaft 3.

If the engine should not remain self-operative, as soon as the speed of the starting motor exceeds that of the pinion and screw shaft, the cranking operation will be resumed. When, however, the engine has become reliably self-operative as evidenced by the rotation of the pinion 25 by the engine gear above a predetermined speed, the detent 27 is withdrawn from the shoulder 33 by centrifugal force and the pinion is then returned to idle position by overrunning the screw shaft, rebounding toward meshing position being prevented by the engagement of the detent 27 with the inclined shoulder 32 on the screw shaft when the excessive rotational speed of the pinion is arrested as the pinion arrives at its idle position.

Although but one embodiment of the invention has been shown and described in detail, it will be understood that other embodiments are possible and that changes may be made in the design and arrangement of the parts without departing from the spirit of the invention.

I claim:

1. In an engine starter drive, a shaft having a socket at one end and a smooth reduced extension beyond the socket forming a circumferential shoulder, a driving anchor plate fixedly mounted on the socket end of said shaft, a second anchor plate slidably and rotatably mounted on the reduced portion of the shaft adjacent said shoulder, a torsion and compression spring connecting said anchor plates, a screw shaft slidably journaled on said reduced portion, having an overrunning clutch connection to the second anchor plate, a pinion having a threaded connection with the screw shaft for movement into and out of mesh with a gear of the engine to be started, and a stop member fixed on said reduced portion of the shaft, defining the operative position of the pinion.

2. An engine starter drive as set forth in claim 1 in which the adjacent surfaces of the second anchor plate and the screw shaft are provided with cooperating overrunning clutch teeth which are clamped together between the shoulder and the stop member on the shaft by the screw-jack action of the screw shaft during the cranking operation.

3. An engine starter drive as set forth in claim 2 including further means on the smooth portion of the shaft for limiting the movement of the second anchor member away from said shoulder.

4. A starter drive as set forth in claim 3 including further a compression spring on said shaft between the stop member and the adjacent end of the screw shaft yieldably holding the overrunning clutch teeth in engagement.

5. A starter drive as set forth in claim 1 including further a detent in the pinion bearing on the surface of the screw shaft, said screw shaft having a shoulder positioned to engage the detent and resist demeshing movement of the pinion.

6. A starter drive as set forth in claim 5 in which the screw shaft has an inclined shoulder positioned to engage the detent and resist initial movement of the pinion away from idle position.

JAMES J. DIGBY.

No references cited.